US005965019A

United States Patent [19]
Olsen et al.

[11] Patent Number: 5,965,019
[45] Date of Patent: Oct. 12, 1999

[54] ENCAPSULATED LENTICULAR FILTER CARTRIDGE

[75] Inventors: Daniel K. Olsen, North Branford; John L. Pulek, Cheshire; Jeffrey A. Lucas, Clinton; Laurie Iturrino, Lebanon; Thomas J. Hamlin, Vernon; Eric Cizek, Avon; Clifford L. Schorr, Cheshire, all of Conn.

[73] Assignee: Cuno Incorporated, Meriden, Conn.

[21] Appl. No.: 08/968,515

[22] Filed: Nov. 11, 1997

Related U.S. Application Data

[60] Provisional application No. 60/031,827, Nov. 26, 1996.

[51] Int. Cl.$^6$ ........................................... B01D 39/00
[52] U.S. Cl. .................... 210/331; 210/331; 210/486; 210/445; 210/446; 210/453; 210/346
[58] Field of Search ................................ 210/322, 323.1, 210/330, 331, 335, 346, 486, 445, 488, 446, 453, 232; 55/510

[56] References Cited

U.S. PATENT DOCUMENTS

| | | |
|---|---|---|
| 2,788,901 | 4/1957 | Boeddinghaus et al. . |
| 3,002,870 | 10/1961 | Belgarde et al. . |
| 4,347,208 | 8/1982 | Southall . |
| 4,388,187 | 6/1983 | Eaglestone . |
| 4,501,663 | 2/1985 | Merrill . |
| 4,579,657 | 4/1986 | Hood, Jr. . |
| 4,704,207 | 11/1987 | Chu . |
| 4,783,262 | 11/1988 | Ostreicher et al. . |
| 5,022,986 | 6/1991 | Lang . |
| 5,026,478 | 6/1991 | Tanabe et al. . |
| 5,256,285 | 10/1993 | Tomita et al. . |
| 5,290,445 | 3/1994 | Buttery . |
| 5,320,237 | 6/1994 | Stolzman . |
| 5,445,734 | 8/1995 | Chen . |
| 5,453,184 | 9/1995 | Handtmann . |
| 5,462,675 | 10/1995 | Hopkins et al. . |

FOREIGN PATENT DOCUMENTS

| | | |
|---|---|---|
| 613 710A1 | 5/1989 | European Pat. Off. . |
| 0 396 385 A2 | 11/1990 | European Pat. Off. . |
| 2 478 483 | 5/1981 | France . |
| 3125841A1 | 2/1981 | Germany . |
| 85 16 808 | 9/1986 | Germany . |
| 3741552A1 | 12/1987 | Germany . |
| 1 340 726 | 10/1971 | United Kingdom . |
| 2 220 866 | 7/1989 | United Kingdom . |

OTHER PUBLICATIONS

Derwent English Language Abstract of DE3741552A1.
Kleenpak Filter Assemblies, Product Information, pp. 1–8, Pall Process Filtration Ltd, (1992).
Pall HDCII Filter Product Brochure, pp. 1–16, Pall Process Filtration Company (1989).
MilliPak• ™Product/Application Profile PF324, Millipore Corp. (1982).
Derwent English language Abstract for DE3125841A1 listed above Feb. 10, 1981.

*Primary Examiner*—W. L. Walker
*Assistant Examiner*—Terry K. Cecil
*Attorney, Agent, or Firm*—Cummings & Lockwood

[57] ABSTRACT

A fluid filtration device is disclosed which includes a capsule housing having an upper housing portion defining an axial fluid inlet and a lower housing portion defining an axial fluid outlet, a filter assembly including an elongated mounting post and a plurality of filtration cells supported on the mounting post in axially spaced apart relationship, and structure operatively associated with the mounting post and the lower housing portion for effectuating axial compression of the filtration cells relative to the mounting post when the mounting post is engaged in the lower housing portion during assembly.

25 Claims, 10 Drawing Sheets

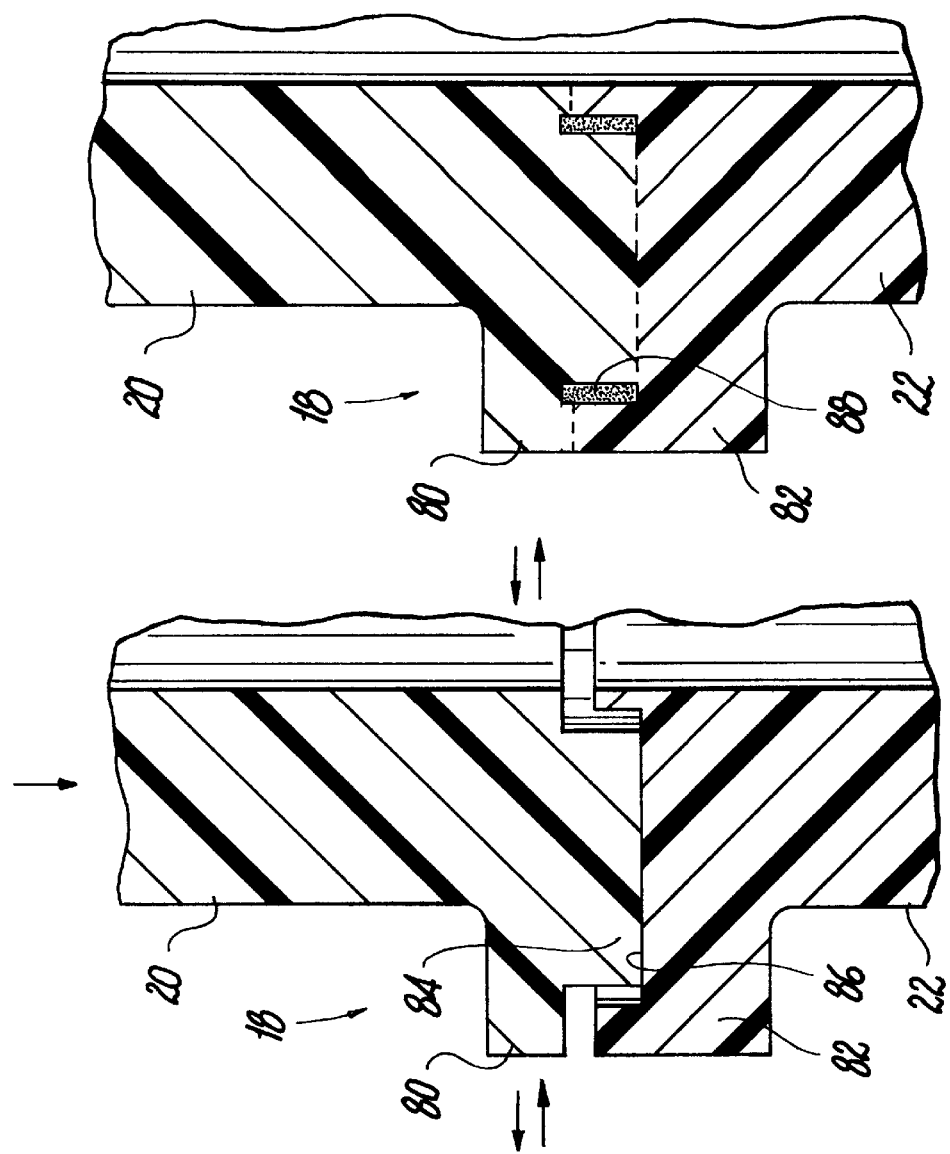

ENCAPSULATED LENTICULAR FILTER CARTRIDGE

CROSS-REFERENCE TO RELATED APPLICATIONS

This application claims priority to provisional application Ser. No. 60/031,827 filed Nov. 26, 1996.

BACKGROUND OF THE INVENTION

1. Field of the Invention

The subject invention relates to fluid filtration devices, and more particularly, to a lenticular filter cartridge assembly housed within a disposable capsule and intended for use in conjunction with a fluid processing system.

2. Background of the Related Art

Cell type filter assemblies, often referred to as lenticular filter assemblies, are well known in the art and have been employed in fluid processing systems for many years. An early example is disclosed in U.S. Pat. No. 2,788,901 to Boeddinghaus et al. Lenticular filter assemblies often include a plurality of vertically oriented coaxially arranged filtration cells disposed within a cylindrical housing. Typically, such a filter housing is formed by structural portions which are secured together by conventional clamping devices that allow for access to the interior of the housing to facilitate filter replacement and maintenance. Examples of prior art filtration cells are disclosed in U.S. Pat. No. 4,783,262 to Ostreicher et al. and U.S. Pat. No. 4,347,208 to Southall In known prior art lenticular filtration assemblies, the uppermost and lowermost filtration cells in a filter housing are oftentimes provided with a compressible gasket or O-ring to effect a seal against the housing. See, for example, commonly assigned U.S. Pat. No. 4,704,207 to Chu. In other devices, these cells may be welded to the top and bottom of the cartridge housing to seal process fluids within the system. Additionally, it is known to provide sealing gaskets intermediate adjacent filtration cell layers to effect a seal therebetween, as disclosed in U.S. Pat. No. 4,704,207 to Chu.

During use, process fluid enters the filter housing through an inlet port, passes through the filtration cells, and exits the housing through an outlet port. Over time, the filtration cells will exhibit plugging or the batch will be completed, and the filtration cells are not reused to prevent cross-contamination of process fluids. Thus, to properly maintain the fluid processing system, the structural portions of a conventional filter housing must be separated, the spent filtration cells must be removed, the housing must be thoroughly cleaned to remove contaminants and residues deposited therein, and new filtration cells must be emplaced in the housing, along with any associated sealing gaskets. Such a maintenance procedure can be time consuming and costly since the fluid processing system must be brought off-line for an excessive time period. Thus, it would be extremely desirable to provide an inexpensive fully encapsulated cell type filter assembly that could be readily removed from a fluid processing system, discarded after removal, and replaced with a new filter assembly.

Another problem associated with the use of conventional inline filtration systems such as a lenticular filtration systems is that of hold-up volume. This is the volume of excess process fluid which accumulates in the bottom of the filter housing below the outlet opening thereof. During routine maintenance, or when spent filtration cells are replaced, the filter housing must be opened. This can result in contamination of the excess process fluid which must then be discarded. In filtration systems employed in the manufacture of biopharmaceuticals or pharmaceuticals, process fluids can be extremely valuable, and the loss thereof due to contamination can be very costly. A prior art filter assembly which employs a mechanism for reducing or decreasing hold-up volume in a filter housing is disclosed in U.S. Pat. No. 5,462,675 to Hopkins et al. This prior art assembly does not however, provide a mechanism for recovering excess process fluids from a filter housing. Clearly, the provision of such a mechanism would be extremely desirable.

SUMMARY OF THE INVENTION

The filtration system of the subject invention provides a disposable cartridge housing which encapsulates a lenticular cartridge assembly including a plurality of axially spaced apart filtration cells. The filtration system employs several unique structural features which are not found in prior art filtration systems. These features include, among others, the manner by which the cartridge housing provides a positive sealing force between the cell media layers and between the lowest cell media layer and the cartridge housing, free of any gasket, O-ring, weld or bond; the manner by which the two generally hemispherical structural portions of the cartridge housing are connected to one another by vibration welding along a circumferential joint having a flash trap associated therewith to provide an aesthetically pleasing commercial product; the method by which unfiltered hold-up volume is drained from the cartridge housing, through a flexible connector hose and into a smaller exterior filtration unit to yield clean effluent; and the manner in which hold-up volume within the cartridge housing is reduced by placing an annular volume reducer within the cartridge housing below the lowest point on the filter assembly.

In brief, the subject invention provides a fluid filtration device which includes a capsule housing including an upper housing portion defining a fluid inlet and a lower housing portion defining a fluid outlet, a filter assembly including an elongated mounting post and a plurality of filtration cells supported on the mounting post in axially spaced apart relationship, and structure operatively associated with the mounting post and the lower housing portion for effectuating axial compression of the filtration cells relative to the mounting post when the mounting post is engaged in the lower housing portion during assembly, whereby a positive sealing force is established between each cell and between the lowermost cell in the filter assembly and the lower housing portion.

The structure for effectuating axial cell compression includes a radially extending compression flange formed at an upper end portion of the mounting post and an engagement fitting formed at a lower end portion of the mounting post. The engagement fitting of the mounting post is dimensioned and configured to engage an annular retention rib formed within the lower housing portion, coaxial with an annular support flange also formed in the lower housing portion. At least one annular sealing rib projects downwardly from a lower surface of the compression flange for sealingly engaging an upper layer of an uppermost filtration cell in the filter assembly, and at least one annular sealing rib projects upwardly from an upper surface of the support flange for sealingly engaging a lower layer of a lowermost filtration cell in the filter assembly. Preferably, annular spacer rings are positioned between adjacent filtration cells in the filter assembly and spacer rings include at least one upper sealing rib for engaging a lower layer of an adjacent filtration cell located thereinabove and at least one lower annular sealing rib for engaging an upper layer of an adjacent filtration cell located therebelow.

As discussed briefly hereinabove, in a preferred embodiment of the subject invention, an annular volume reducer is disposed in the lower housing portion circumjacent the annular support flange for displacing excess process fluid which accumulates in the lower housing portion, and a drainage port is formed in the lower housing portion for facilitating drainage of excess process fluid therefrom. Additionally, a kit is provided for retrieving excess process fluid from the lower housing portion which includes a conduit and a portable supplemental filtration unit. The conduit has a connector at one end for mating with the drainage port and a connector at the opposed end for mating with the supplemental filtration unit. The supplemental filtration unit has an outlet port for transferring the excess process fluid to a containment device.

In accordance with a preferred embodiment of the subject invention, the upper housing portion and the lower housing portion are joined together along an equatorial joint which is defined by a circumferential tongue on a mating surface of the upper housing portion and a circumferential groove in a mating surface of the lower housing portion. Preferably, the groove is dimensioned and configured as a flash pot to accommodate residual flash material produced when the tongue and groove are joined together by vibratory welding.

These and other unique features of the encapsulated lenticular filter cartridge assembly of the subject invention will become more readily apparent from the following description of the drawings.

BRIEF DESCRIPTION OF THE DRAWINGS

So that those having ordinary skill in the art to which the subject invention appertains will more readily understand how to construct and use the encapsulated lenticular filter cartridge assembly of the subject invention, reference may be had to the drawings wherein:

FIGS. 10a–10c illustrate in sequential order the manner by which the upper and lower halves of the cartridge housing are assembled by means of a vibration welding technique, and the utilization of an equatorial flash trap to promote an aesthetically pleasing commercial product;

DETAILED DESCRIPTION OF THE PREFERRED EMBODIMENTS

Figure 1:
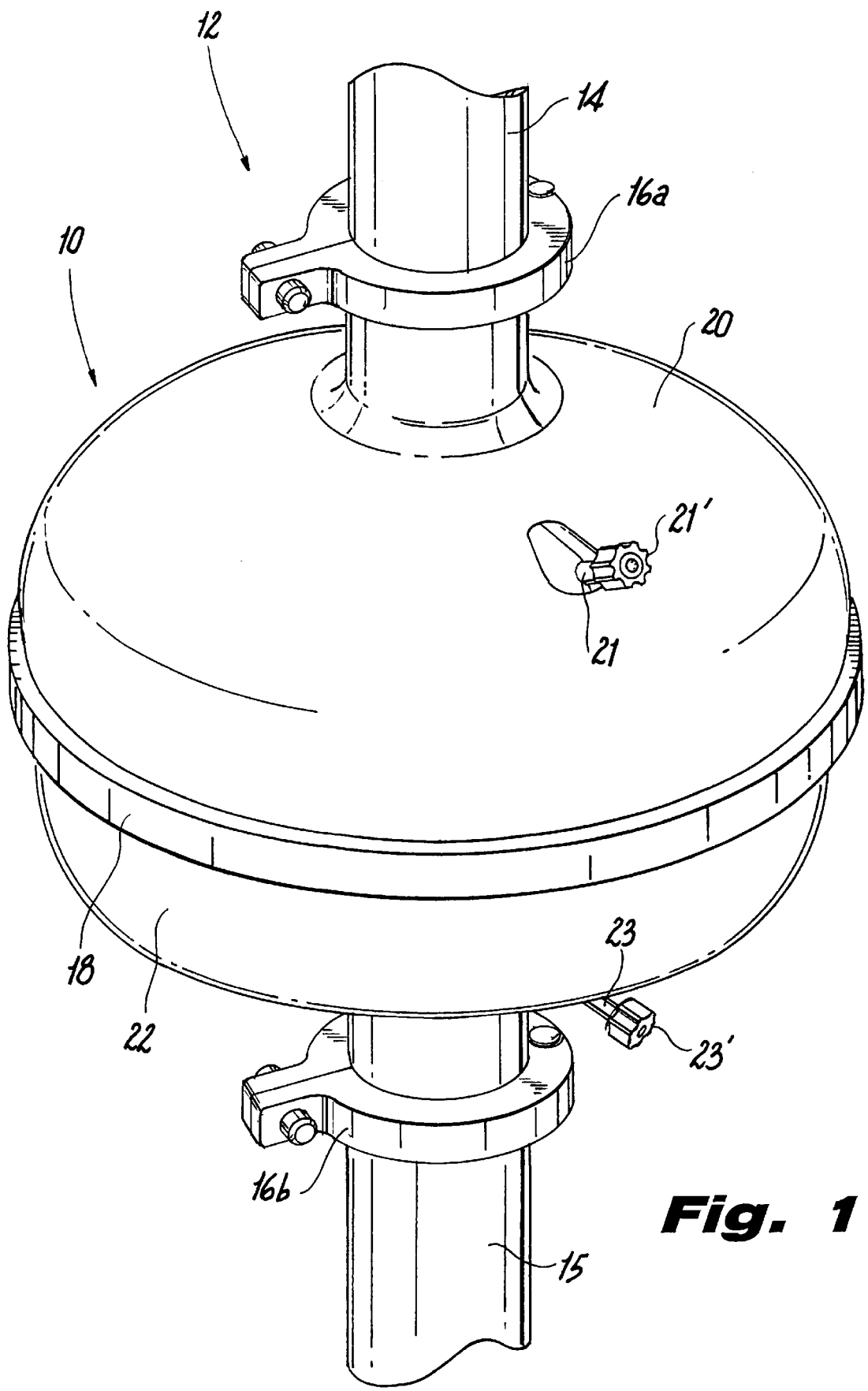
FIG. 1 is an exterior perspective view of an encapsulated lenticular filter cartridge assembly constructed in accordance with a preferred embodiment of the subject invention illustrated in a service position clamped between inlet and outlet conduits of a fluid processing system, such as, for example, a biopharmaceutical fluid processing system.

Referring now in detail to the drawings wherein like reference numerals identify similar structural elements of the subject invention, there is illustrated in FIG. 1 a disposable lenticular filter cartridge constructed in accordance with a preferred embodiment of the subject invention and designated generally by reference numeral 10. Filter cartridge 10 is employed in a fluid processing system 12, such as, for example, in a system for processing pharmaceutical fluids. In such a system, filter cartridge 10 is detachably supported between an inlet conduit 14 and an outlet conduit 15 by conventional sanitary flanges 16a and 16b which have mechanical characteristics which are particularly effective at the design pressure and temperature for the system. During routine maintenance periods, clamping devices 16a and 16b may be readily released to facilitate removal of the filter cartridge 10 from processing system 12.

With continuing reference to FIG. 1, filter cartridge 10 is defined by a capsule housing 18 having a generally hemispherical upper housing portion 20 and a generally hemispherical lower housing portion 22. The two housing portions are secured to one another about the equatorial centerline of the housing by a vibratory welding method which will be explained in greater detail hereinbelow with respect to FIGS. 10a through 10c. Housing portions 20 and 22 are preferably constructed from a high strength plastic material, such as, for example, polysulfone, or a similar material. The upper housing portion 20 includes a vent port 21 which allows air to be fully removed from the filter housing during installation to ensure consistent fill volumes. A cap 21' covers vent port 21 during normal system operation. The lower housing portion 22 includes a drainage port 23 which allows for removal and/or recovery of excess process fluid from the housing during routine maintenance of the processing system 12. Removal of this excess process fluid, commonly referred to as hold-up volume, will be discussed in greater detail hereinbelow with respect to FIG. 11. A cap 23' covers drainage port 23 during normal system operation.

Figure 2:
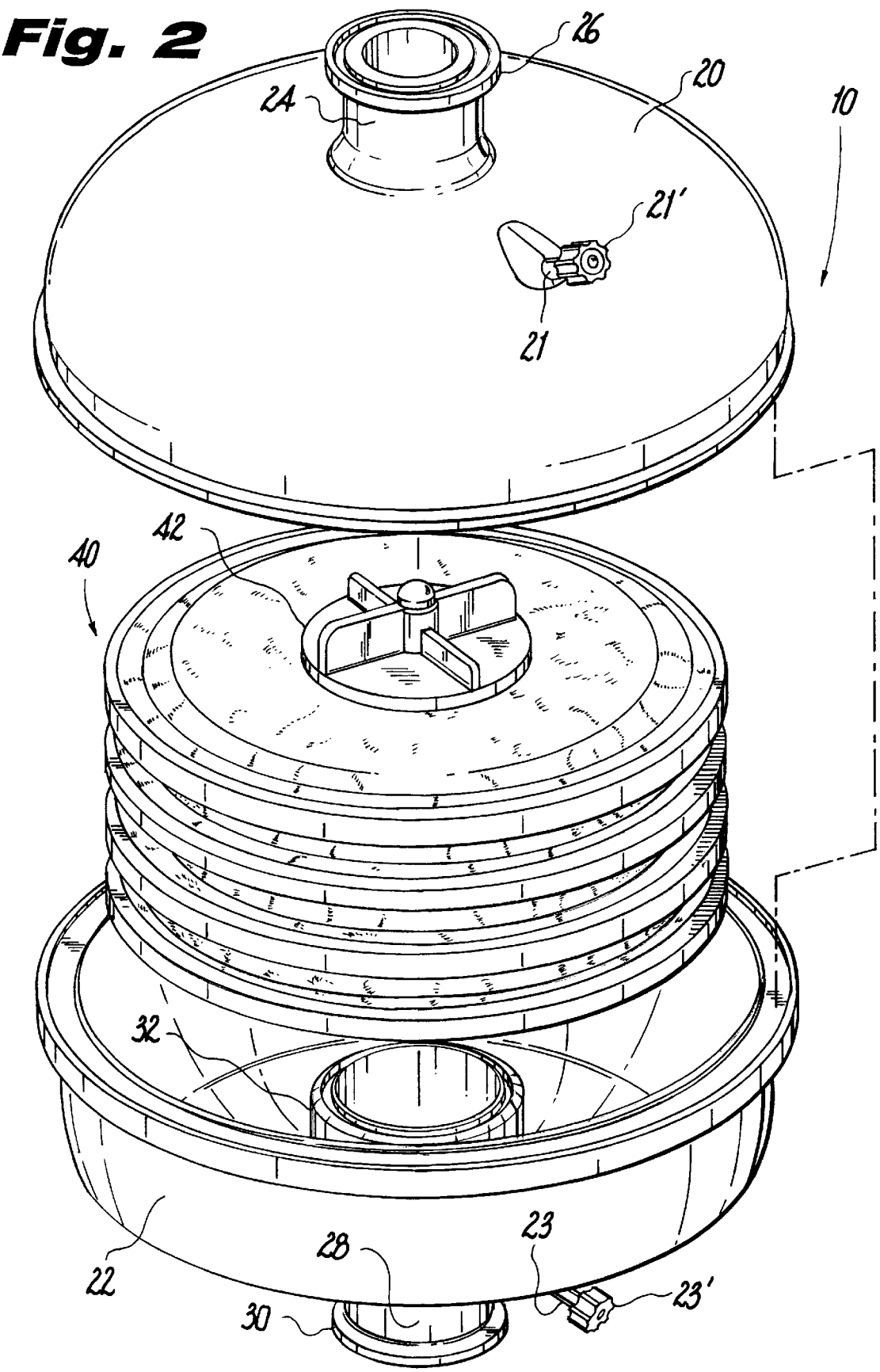
FIG. 2 is an exploded perspective view of the encapsulated lenticular filter cartridge assembly of FIG. 1 with the upper half or the cartridge housing separated from the lower half of the cartridge housing to illustrate the lenticular cartridge assembly which includes a plurality of axially spaced cylindrical filtration cells supported on a central mounting post.
Figure 10:
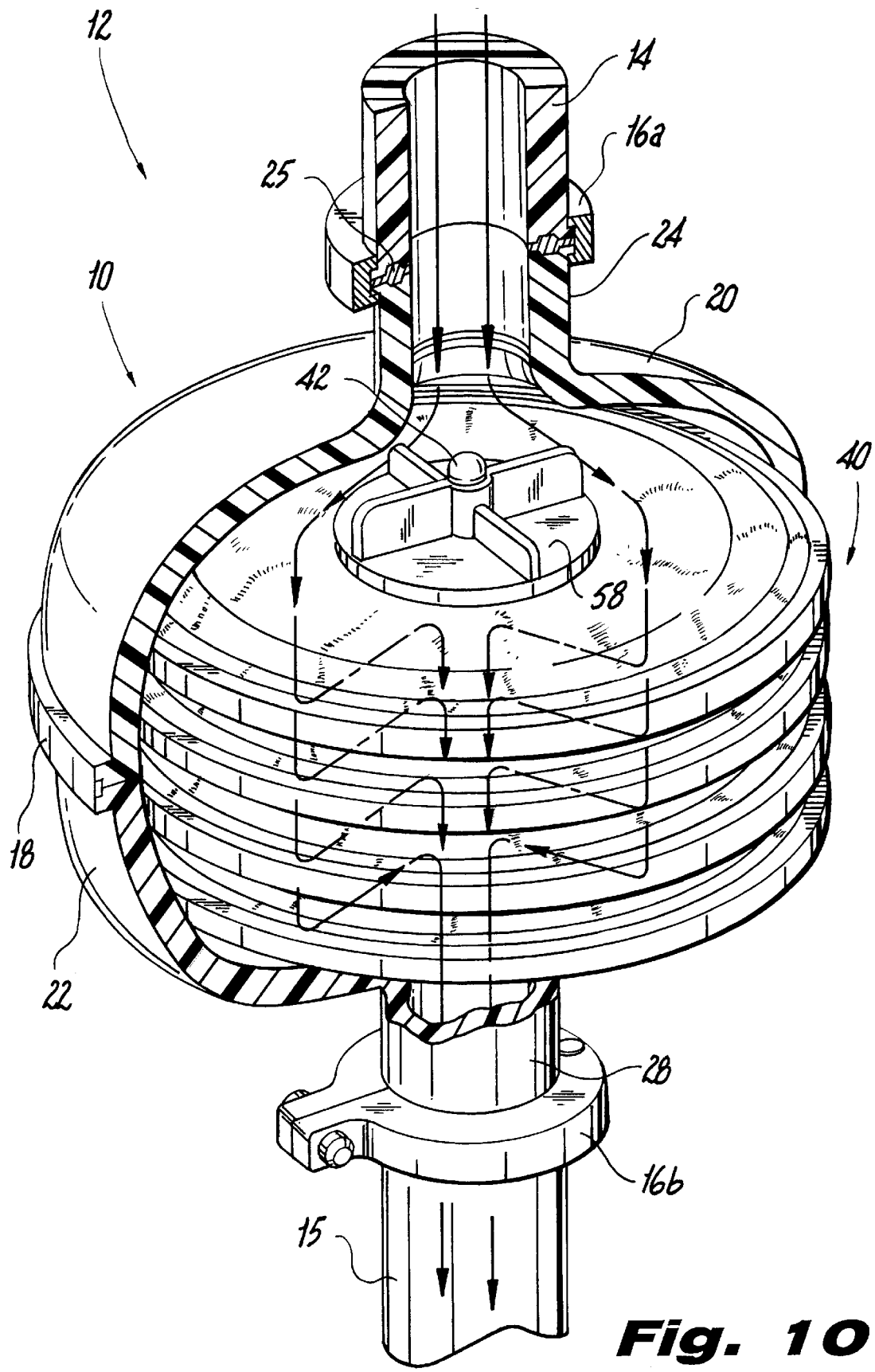
FIG. 10 is a perspective view of the encapsulated lenticular filter cartridge assembly of the subject invention with a substantial portion of the cartridge housing shown in cross-section to illustrate, by way of directional indicator arrows, the flow path of process fluid through the cartridge assembly from the inlet port of the cartridge housing to the outlet port of the cartridge housing.

Referring now to FIG. 2, the upper housing portion 20 includes an axial inlet portion 24 having a sanitary flange 26 at the upper end thereof which is configured for mated alignment with a complementary flange provided at the end of inlet conduit 14. The two complementary inlet flanges are detachably secured together by clamping device 16a, as shown in FIG. 1. Similarly, the lower housing portion 22 of filter cartridge 10 includes an axial outlet portion 28 having a sanitary flange 30 at the lower end thereof which is configured for mated alignment with a complementary flange provide at the end of outlet conduit 16. The two complementary outlet flanges are detachably secured together by clamping device 16b, as shown in FIG. 1. As illustrated in FIG. 10, compressible sanitary gaskets or gaskets 25 are seated between the complementary flanges at the inlet and outlet ends of the cartridge housing.

Referring once again to FIG. 2, the filter cartridge 10 of the subject invention further includes a lenticular cartridge assemblage 40 which is seated on an annular support flange 32 that is integrally formed within the interior cavity of lower housing portion 22, axially aligned with outlet portion 28. Cartridge assemblage 40 is constructed from a plurality of axially stacked cartridge cells, the construction of which will be described in greater detail hereinbelow, which are supported in axially spaced apart relationship on a uniquely configured mounting post 42. The number of filtration cells provided in the cartridge assemblage 40 can vary in any number but in practice from two to four, depending upon the filtration requirements of the process and/or system in which filter cartridge 10 is employed. In either instance, the same filter housing is utilized to maintain economics, though it is possible that the size of the housing could vary. However, mounting posts of different length will be employed depending upon the number of filtration cells in the assemblage.

Figure 3:
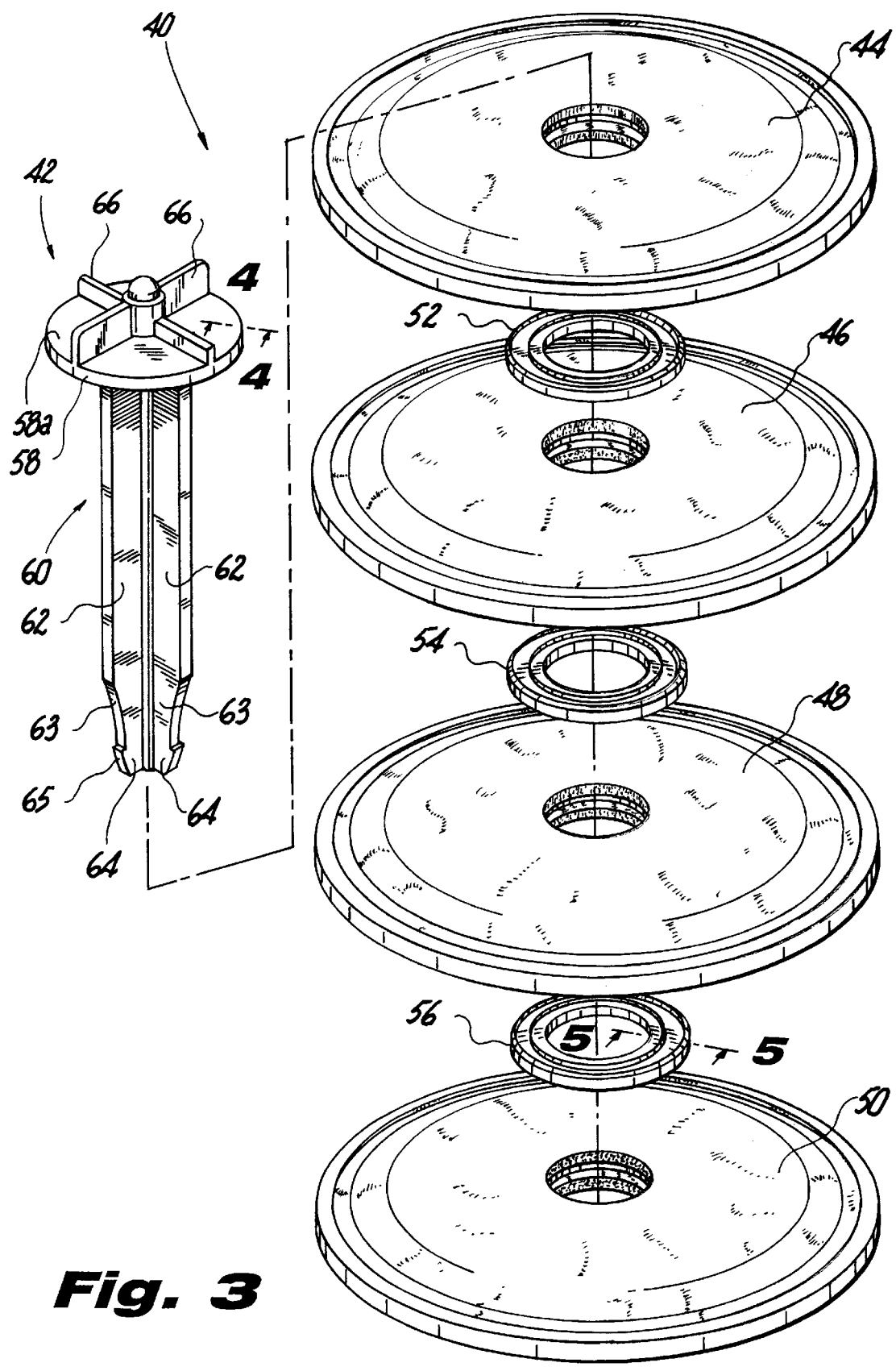
FIG. 3 is an exploded perspective view of the lenticular cartridge assembly shown in FIG. 2 with each of the component parts thereof separated for ease of illustration and including the central mounting post, first through fourth axially spaced apart filtration cells, and first through third spacer rings.

Referring to FIG. 3, a preferred embodiment of cartridge assemblage 40 includes first through fourth filtration cells 44, 46, 48 and 50, with filtration cell 44 referred to hereinafter as the uppermost cell in the assemblage, cells 46 and 48 referred to hereinafter as the upper and lower intermediate cells, respectively, and filtration cell 50 referred to hereinafter as the lowermost cell in the assemblage. A first annular spacer ring 52 is disposed between the bottom surface of the uppermost cell 44 and the top surface of the upper intermediate cell 46 to maintain the axial spacing therebetween. A second annular spacer ring 54 is disposed between the bottom surface of the upper intermediate cell 46 and the top surface of the lower intermediate cell 48 to maintain the axial spacing therebetween. A third annular spacer ring 56 is disposed between the bottom surface of the lower intermediate cell 48 and the top surface of the lowermost cell 50 to maintain the axial spacing therebetween.

Figure 8:
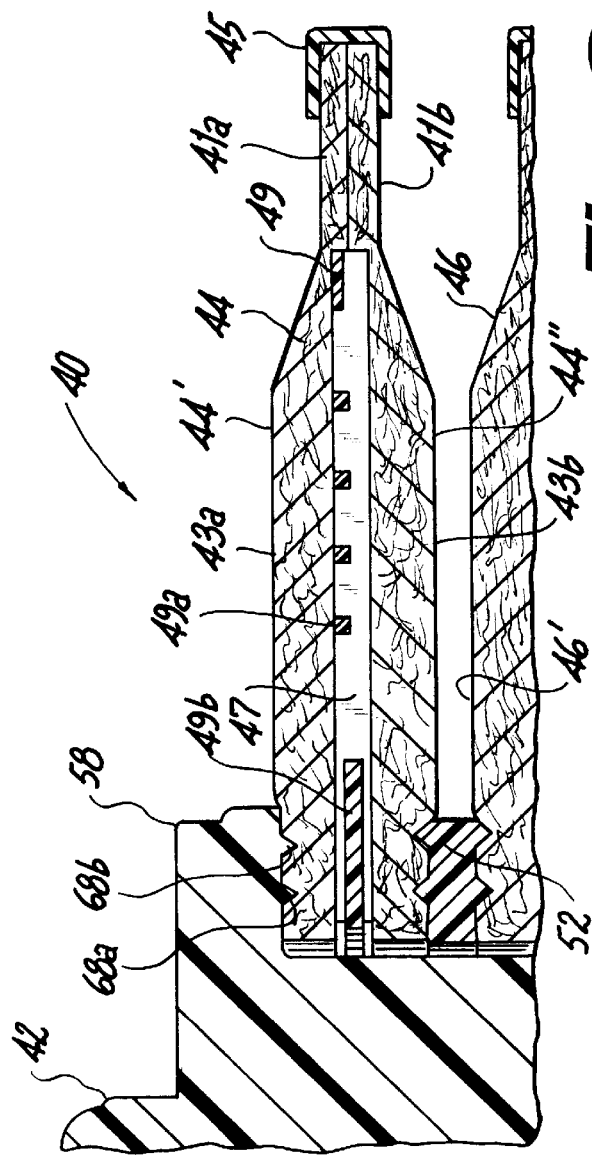
FIG. 8 is a cross-sectional view taken along line 8—8 of FIG. 7 illustrating the manner in which the annular sealing ribs depending from the bottom surface of the compression flange of the mounting post engage the top surface of the uppermost filtration cell, and the manner in which the annular sealing ribs on the upper and lower surfaces of the uppermost spacer ring engage the bottom surface of the uppermost filtration cell and the top surface of the adjacent filtration cell when the engagement portion of the mounting post is engaged in the reception portion of the lower half of the cartridge housing and the component parts of the lenticular cartridge assembly are in compression.

As illustrated in FIG. 8, and by way of example with reference to the uppermost lenticular filtration cell 44, each of the lenticular filtration cells which form the assemblage 40 includes an upper cell layer 44' and a lower cell layer 44". The upper and lower cell layers 44' and 44" of filtration cell 44 include complementary radially outer portions 41a and 41b which are disposed in face-to-face abutting relationship and are secured together by a circumferential edge retention flange 45. The cell layers further include relatively thicker radially inner portions 43a and 43b which define an interior cavity 47 therebetween for accommodating the radially inward flow of process fluid through the filtration cell. Interior cavity 47 opens into the center of the filtration cell. The structural integrity of interior cavity 47 is maintained by an interior support structure 49 having a series of concentrically spaced apart support ribs 49a and a radially inner annular support collar 49b. For a more detailed description of the construction and operation of a similar prior art lenticular filtration cell, reference may be had to commonly assigned U.S. Pat. No. 4,783,262, the disclosure of which is incorporated herein by reference in its entirety.

The cell layers of each filtration cell are preferably formed from a filtration media which is constructed into sheets from a slurry of primarily cellulousic fibers. The sheets are cut into discs by stamping or punching, a process which also simultaneously provides an axial aperture in each of the discs. The filtration media is generally rigid in nature. However, it is compressible when acted upon by an applied force. By way of example, if each filtration cell is formed from two of such discs, and each cell has an outer diameter of approximately 7.0 in., the assemblage 40, which can employ 2–4 filtration cells, will have a total filtration area ranging from 1 to 2 sq. ft.

Referring once again to FIG. 3, mounting post 42 extends through the central aperture formed in each filtration cell to maintain the cells, as well as the plural spacer rings, in an axially stacked relationship. Mounting post 42 includes a radial compression flange portion 58 and an elongated descending shaft portion 60, the length of which can vary depending upon the number of filtration cells in the assemblage. Shaft portion 60 is defined by four radially spaced apart elongate support struts each designated by reference numeral 62. The lower end portion of each support strut is formed with an inwardly tapered notch portion 63 and a radially outwardly extending terminal portion 64 having an inwardly tapered leading edge 65. This lower end portion of shaft portion 60 forms an engagement fitting which is configured to engage an annular retention ring 67 projecting radially inwardly from the interior wall of the outlet portion 28 of housing portion 22 when cartridge assemblage 40 is seated on support flange 32. (See, FIG. 7).

Figure 6:
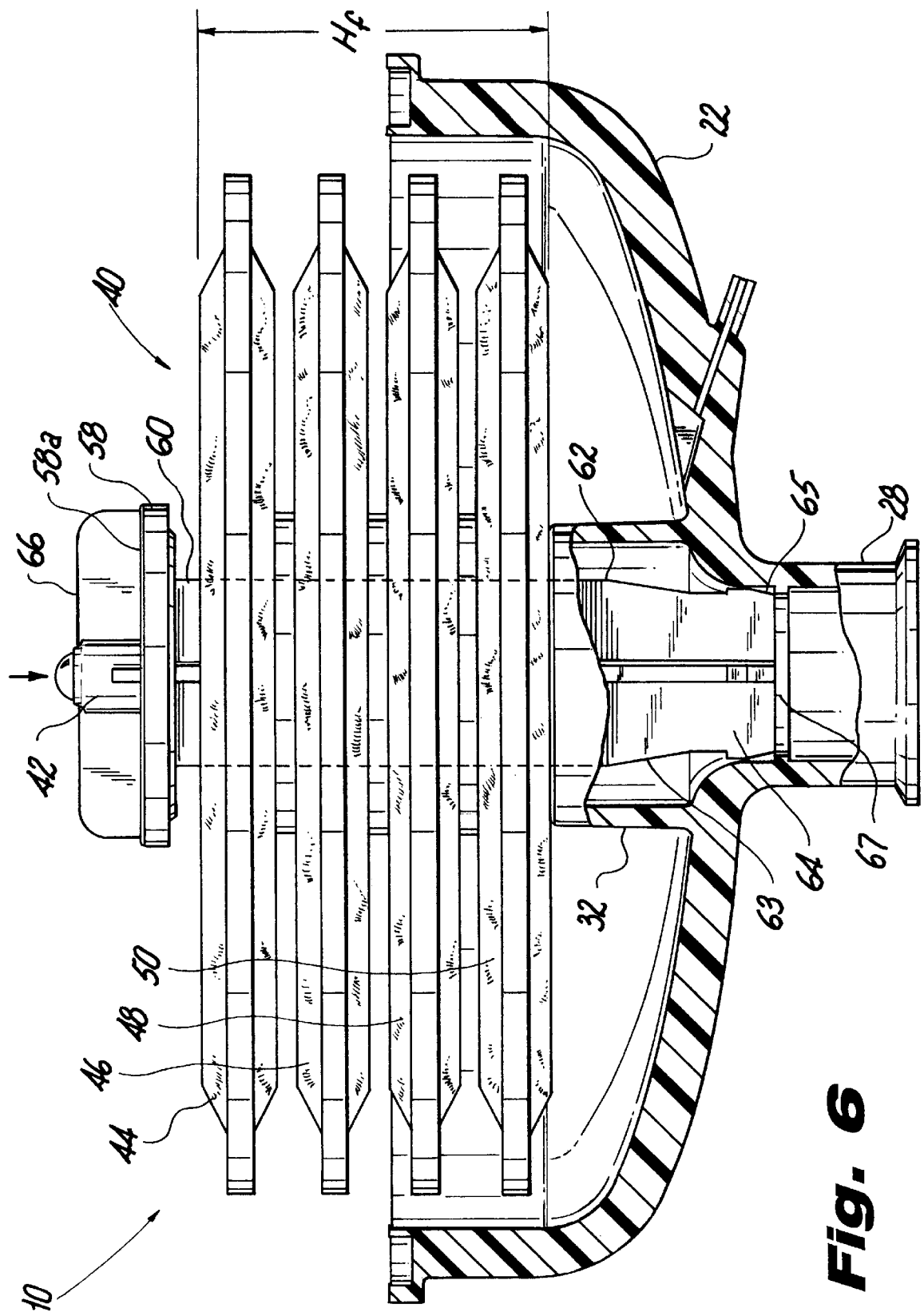
FIG. 6 is a side-elevational of the lower half of the cartridge housing and the lenticular cartridge assembly with the cartridge housing shown in partial cross-section to illustrate the manner in which the outwardly extending retention flanges which form the engagement fitting on the lower portion of the mounting post are engaged and retained within the axial outlet passage of the cartridge housing.

As best seen in FIG. 6, the terminal end portion 64 of each support strut 62 has an outer diameter that is greater than the inner diameter of the annular retention ring 67 formed within outlet portion 28, while the tapered leading edge 65 of each terminal end portion 64 dimensionally conforms to the inner diameter of retention ring 67 to ease the passage of the terminal end portions 64 passed retention ring 67 during assembly of filter cartridge 10. Although not illustrated in the figures, it is envisioned that retention ring 67 could be replaced by four radially spaced apart retention segments which would permit the terminal end portions 64 of each support strut 62 to extend passed the retention structures without interference, whereupon the mounting post 42 would be subsequently rotated 45° into a locked position in which the terminal end portions of the support struts would engage corresponding recesses formed below the four retention segments. With continuing reference to FIG. 6, four radially spaced apart projections 66 extend from the top surface 58a of radial flange portion 58 of mounting post 42 to form a handling structure which facilitates ready manipulation of mounting post 42 during assembly of filter cartridge 10.

Figure 4:
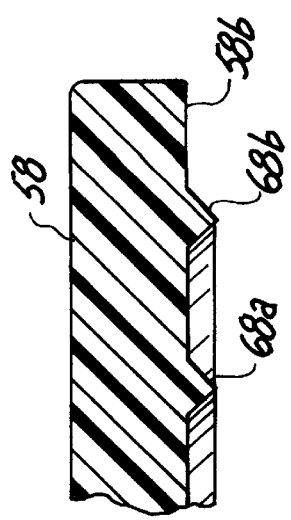
FIG. 4 is a cross-sectional view taken along line 4—4 of FIG. 3 illustrating the annular sealing ribs which depend from the bottom surface of the compression flange of the central mounting post of the lenticular cartridge assembly.

Referring now to FIG. 4, at the time of assembly, mounting post 42 is designed to axially compress each of the axially arranged elements of assemblage 40 into a tightly stacked unit, free of any intermediate sealing or gasketing components between the filtration cells of the assemblage 40 and other structures of the filter cartridge 10 to effect a positive seal therebetween. This is achieved by providing integrally formed sealing structures on several of the component parts of the assemblage 40, as well as on the lower housing portion 22 of filter cartridge 10. In particular, the bottom surface 58b of circular flange portion 58 includes two concentric sealing ribs 68a and 68b which are configured as saw-teeth to intimately engage, and more particularly, to penetrate into the compliant top surface 44a of the upper cell layer 44' of the uppermost filtration cell 44, as illustrated in FIG. 8.

Figure 5:
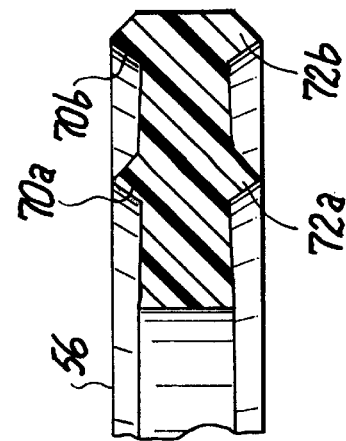
FIG. 5 is a cross-sectional view taken along line 5—5 of FIG. 3 illustrating the annular sealing ribs which depend from the top and bottom surfaces of the spacer rings that separate each filtration cell in the lenticular cartridge assembly.

Each of the annular spacer rings 52, 54, and 56 of assemblage 40 includes similar cell layer penetrating sealing structures. For example, as illustrated in FIG. 5, annular spacer ring 52 includes upper concentric sealing ribs 70a and 70b for penetrating the compliant bottom surface 44b of the lower cell layer 44" of filtration cell 44 and lower concentric sealing ribs 72a and 72b for penetrating into the compliant top surface 46a of the upper cell layer 46' of upper intermediate filtration cell 46, as best seen in FIG. 8.

Figure 9:
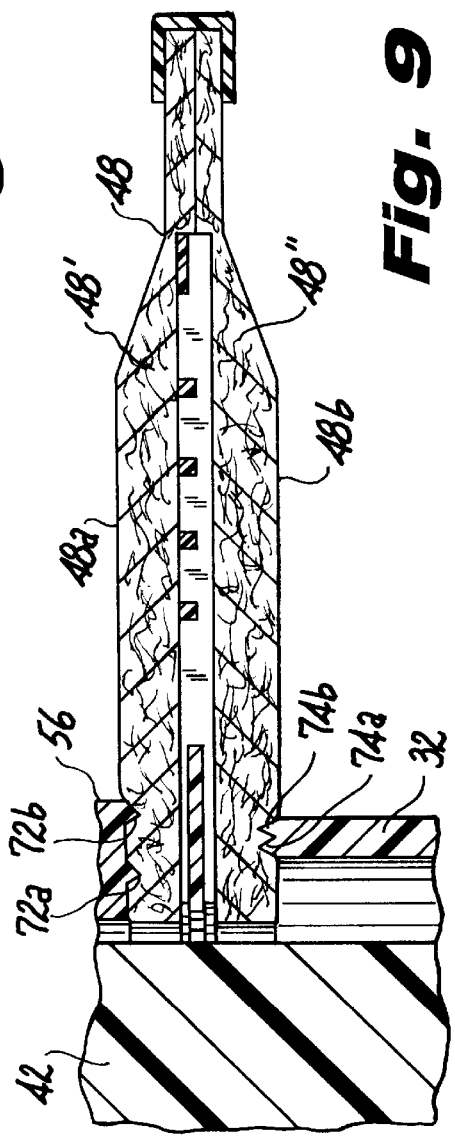
FIG. 9 is a cross-sectional view taken along line 9—9 of FIG. 7 illustrating the manner in which the annular sealing ribs depending from the bottom surface of the bottom-most spacer ring engage the top surface of lowest filtration cell, and the manner in which the annular sealing ribs formed about the upper surface or rim of the cylindrical cartridge seat in the lower half of the cartridge housing engage the bottom surface of the lowest filtration cell when the engagement portion of the mounting post is engaged in the reception portion of the lower half of the cartridge housing and the component parts of the lenticular cartridge assembly are in compression.

As discussed briefly hereinabove, cartridge assemblage 40 is seated on the annular support flange 32 which projects upwardly from the bottom of lower housing portion 22 in axial alignment with the outlet portion 28. As best seen in FIG. 9, the top surface of support flange 32 is formed with two closely spaced sealing ribs 74a and 74b configured to penetrate the compliant bottom surface 48b of the lower cell layer 48" of the lowermost filtration cell 48 when the assemblage is seated on support flange 32 to effect a positive seal therebetween. Dual sealing ribs 74a and 74b are medially aligned between the concentric sealing ribs of the axial spacer rings to evenly support compressive forces established during assembly.

Figure 7:
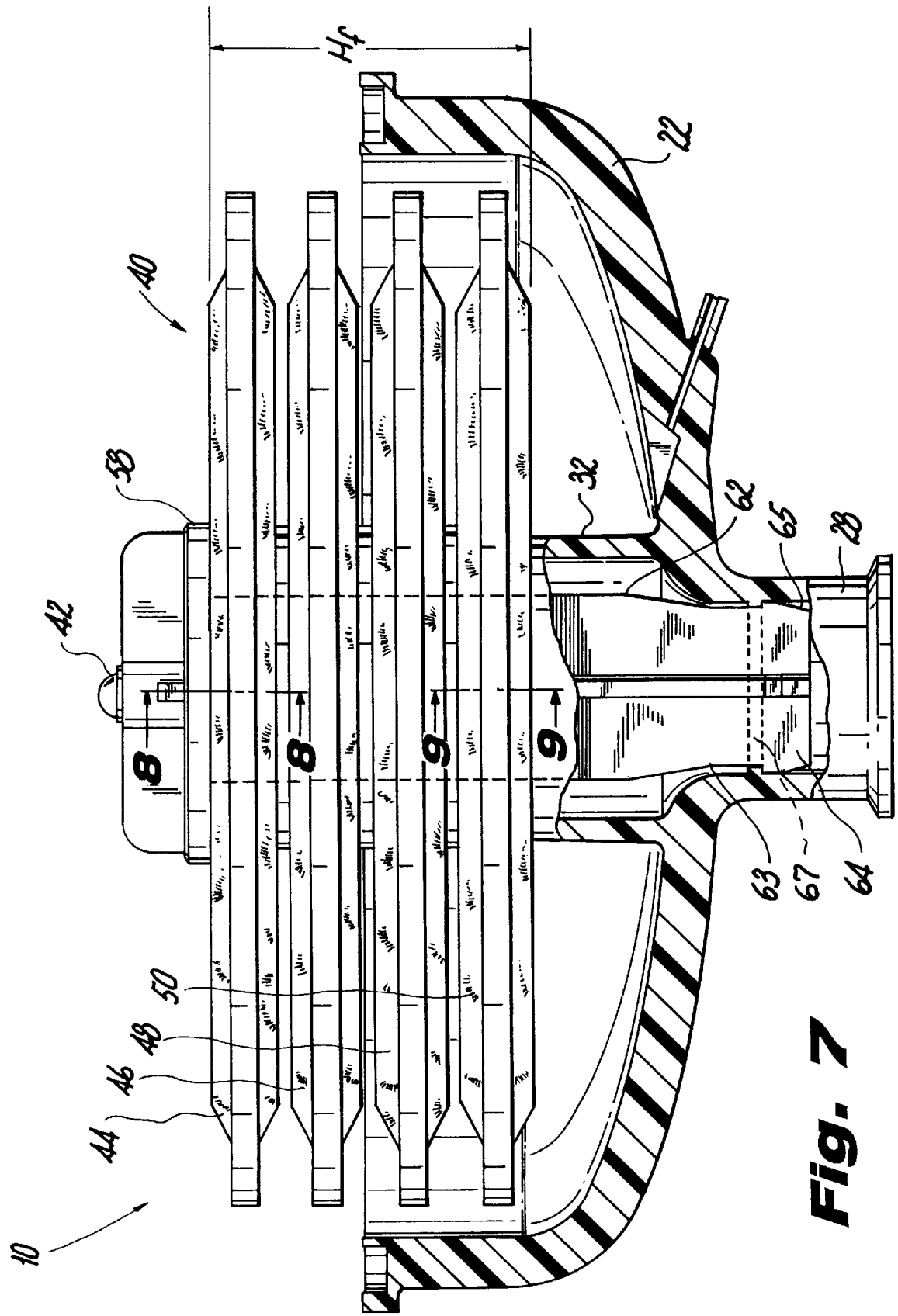
FIG. 7 is a side-elevational of the lower half of the cartridge housing and the lenticular cartridge assembly with the cartridge housing shown in partial cross-section to illustrate the engaged position of lower engagement fitting of the mounting post within the axial outlet passage of the cartridge housing.

As best seen in FIG. 6, prior to assembly, the plural filtration cells of assemblage 40 are disposed in an uncompressed, spaced apart, axial stacked arrangement. At such a time, the axial height of the uncompressed filter stack may be expressed by a dimension $H_i$. To mount the uncompressed assemblage 40 in the lower housing portion 22, the engagement fitting formed at the bottom end of the descending shaft portion 60 of mounting post 42 is extended into axial support flange 32. Thereupon, an axially directed downward force is exerted upon mounting post 42 to urge the terminal end portions 64 passed retention ring 67. Once the terminal end portions 64 of mounting post 42 have moved passed retention ring 67, the retention ring assumes an engaged position located within the notched region 63 of each support strut 62. Continued exertion of a downward force on compression flange during assembly, causes the axially spaced apart plural filtration cells of assemblage 40 into a compressed condition which is best seen in FIG. 7. In this compressed state, such that the filter stack has an axial height $H_f$ which is less than the initial height $H_i$ of the uncompressed filter stack illustrated in FIG. 6.

In the compressed state illustrated in FIG. 6, the cell layer sealing structures on the bottom surface 58a of compression flange 58, on each of the annular spacer rings 52, 54, and 56, and on the top surface 32a of mounting flange 32 penetrate an adjacent compliant filtration cell layer to effect a positive sealing force. The positive sealing force effected by the compressive action of mounting shaft 42 in conjunction with the lower housing portion 22 during assembly obviates the need for supplemental sealing structure such as gaskets or O-rings, particularly between the bottom surface 48b of the lowermost filtration cell 48 and the top surface of support flange 32.

Referring now to FIG. 10, as discussed briefly hereinabove, the generally hemispherical upper and lower housing portions 20 and 22 of capsule housing 18 are secured to one another about the equatorial centerline of the housing. To effectuate this securement, the two housing portions form an equatorial joint defined by an upper circumferential flange 80 on the upper housing portion 20 and a lower circumferential flange 82 of the lower housing portion 22. As best seen in FIG. 10a, the upper circumferential flange 80 has an axially projecting circumferential tongue 84 which interacts with an axially extending circumferential groove 86 formed in the lower circumferential flange 82. Groove 86 has a radial profile which is wider than that of tongue 84 and thus is it serves to facilitate relative movement of the tongue, and in addition it serves as a containment area or trap for flash material 88 which is produced by the vibratory welding process employed to join the two housing portion together during assembly of filter cartridge 10.

As shown in FIG. 10b, during the vibratory welding process, with the tongue 84 and groove 86 engaged, the lower housing portion 22 is maintained in a stationary position, and the upper housing portion 20 is oscillated relative thereto at an extremely low frequency, in the range of 50–100 Hz, along the equatorial plane of the capsule housing 18. At the same time, a downward force is exerted on the upper housing portion 20 to further effectuate the welding process. As illustrated in FIG. 10c, the flash material which results from the vibratory welding process remains entirely within groove 86, which, as stated above acts as a flash trap. Consequently, a clean circumferential seamline 88 is created between the upper and lower housing portions 20 and 22, thereby producing an aesthetically pleasing commercial product.

Referring once again to FIG. 10, when fluid processing system 12 is operating, unfiltered process fluids, indicated by directional flow lines, ingress into axial inlet portion 24 from inlet conduit 14 and flow into capsule housing 18. System pressure draws the unfiltered process fluid into the filtration cells of assemblage 40 in a radially inward direction, through the filter media, into the radial flow passages defined therein, and out to the central bore of the assemblage. The filtered process fluids are then drawn down through the center of filter assemblage 40, into the outlet portion 28 whereupon the filtered process fluid egresses from the capsule housing 18 through outlet conduit 15.

Figure 11:
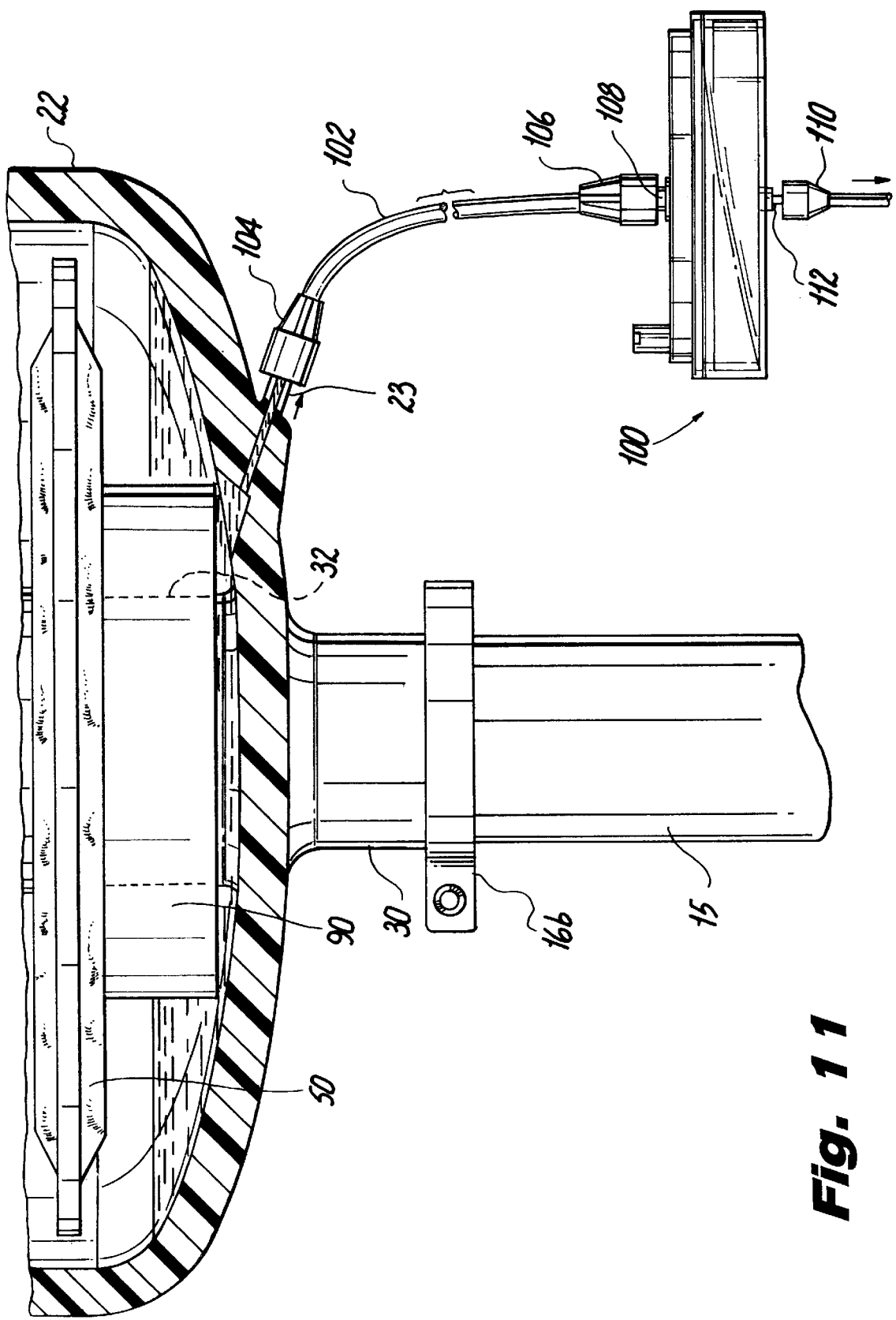
FIG. 11 is a side-elevational view in partial cross-section of the lower half of the cartridge housing illustrating the utilization of a cylindrical hold-up volume reducer disposed below the lowermost filtration cell in the lenticular cartridge assembly, and the manner in which hold-up volume is drained from the cartridge housing into a supplemental exterior filtration unit by way of a flexible conduit connected to a discharge port of the cartridge housing to yield clean effluent.

Referring now to FIG. 11, in a preferred embodiment of the encapsulated filter cartridge 10 of the subject invention, a cylindrical ring 90 is disposed in the bottom of lower housing portion 22, below the lowermost filtration cell 50, circumjacent support flange 32 for reducing the hold-up volume or excess unfiltered process fluid which accumulates below the level of the outlet port defined by support flange 32. In essence, ring 90 displaces a certain volume of fluid in the lower housing portion. The ring is preferably formed form a material which is compatible with the filtrate used in the subject filtration apparatus.

Because the filter device 10 of the subject invention is particularly adapted for use in conjunction with a system for processing relatively expensive pharmaceutical fluids, it is extremely desirable to reclaim or recover excess process fluid which may accumulate in lower housing portion 22 below the level of the outlet port thereof. Accordingly, as illustrated in FIG. 11, a supplemental filtration device 100 may be connected to the drainage port 23 by way of a flexible conduit 102 to reclaim the unfiltered or excess process fluid. A connective fitting 104 is provided at one end of conduit 102 to mate with the drainage port 23 of housing portion 22, and a connective fitting 106 is provided at the other end of conduit 102 to mate with an inlet port 108 of supplemental filtration device 100. The connective fittings are preferably luer lock connections, although alternative mechanical connections may be employed. A second conduit 110 is connected to the outlet port 112 of supplemental filtration device 100 to transfer the supplementally filtered excess process fluid to a containment vessel.

Figure 12:
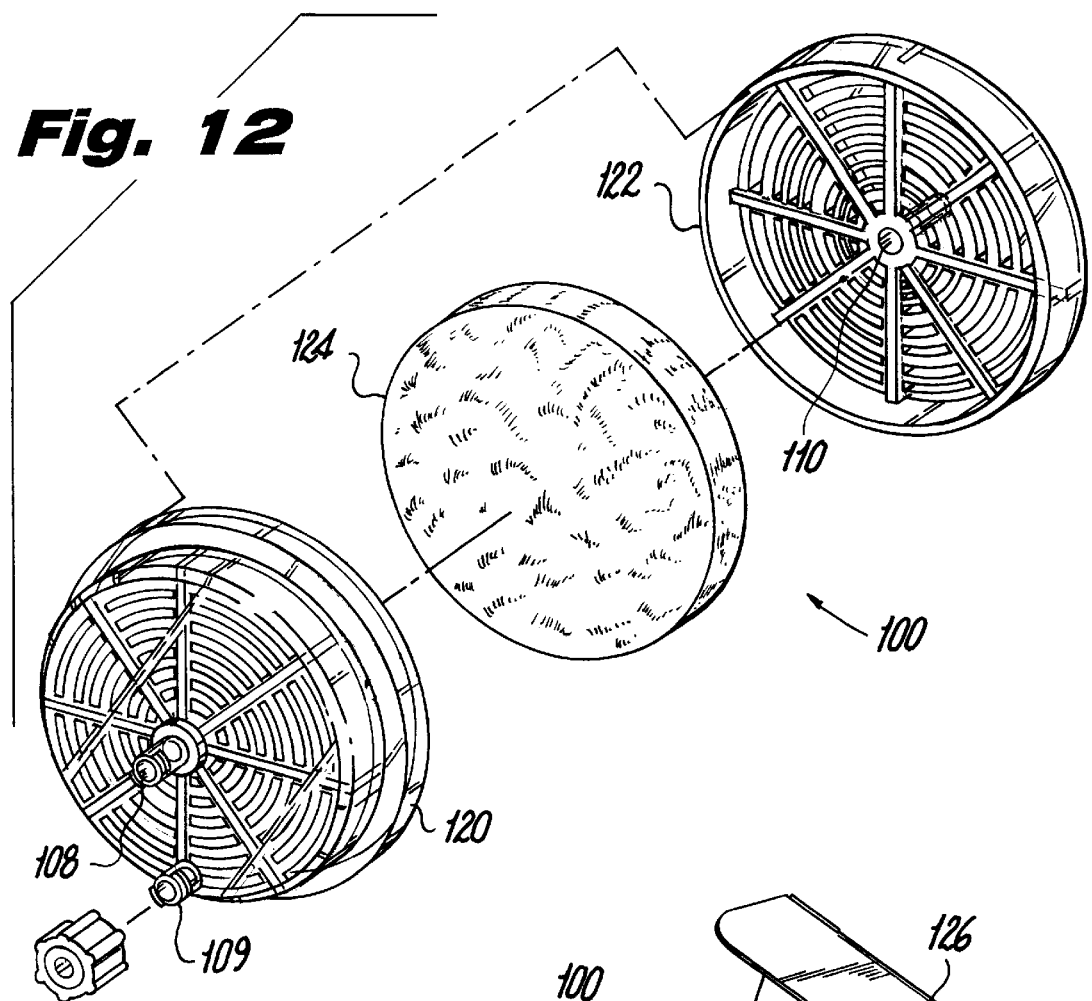
FIG. 12 is an exploded perspective view of the supplemental filtration unit illustrated in FIG. 11 with the sealing cap associated therewith.
Figure 13:
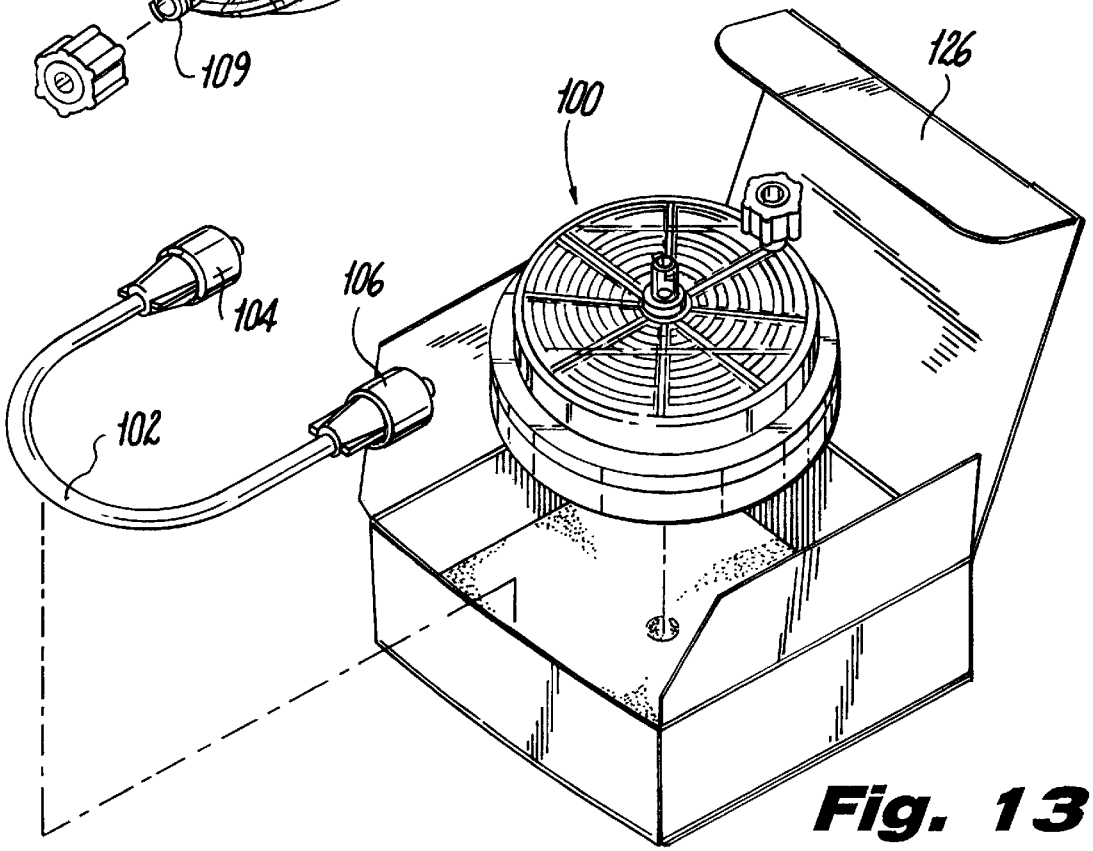
FIG. 13 is a perspective view of a kit having an enclosure containing the supplemental filtration unit and the flexible conduit utilized to connect the supplemental filtration unit to the cartridge housing as illustrated in FIG. 12.

As best seen in FIG. 12, the secondary filtration device 100 includes an upper filter body 120 defining inlet port 108 and a vent port 109, a lower filter body 122 defining outlet port 110, and a filter member 124 constructed from a filtrate or media that is substantially similar to that from which the filtration cells of assemblage 40 are constructed. Referring to FIG. 13, the secondary filtration device 100, fluid conduit 102, and associated connective fittings 104 and 106 are preferably marketed and sold by the manufacturer of filtration device 10 as a kit, and therefore have an associated packaging enclosure 126 furnished therewith.

Although the fluid filtration apparatus of the subject invention has been described with respect to a preferred embodiment, it is apparent that modifications and changes can be made thereto without departing from the spirit and scope of the invention as defined by the appended claims.

What is claimed is:

1. A fluid filtration device comprising:
   a) a capsule housing including an upper housing portion, a lower housing portion having an annular retention ring formed therein, a fluid inlet defined in the upper housing portion, and a fluid outlet defined in the lower housing portion;
   b) an elongated mounting post having an upper end portion including a compression flange and a lower end portion including an engagement fitting dimensioned and configured to engage said annular retention ring, said annular retention ring projecting radially inwardly to engage said engagement fitting; and
   c) a plurality of filtration cells supported on said mounting post in axially spaced apart relationship, said filtration cells adapted to be axially compressed relative to said mounting post by said compression flange when said engagement fitting is engaged with said annular retention rib.

2. A fluid filtration device as recited in claim 1, wherein an annular support flange is formed integral with said lower housing portion for supporting said filter assembly and defining a sealing surface to effect said positive seal.

3. A fluid filtration device as recited in claim 2, wherein at least one annular sealing rib projects downwardly from a lower surface of said compression flange for sealingly engaging an upper layer of an uppermost filtration cell in said filter assembly.

4. A fluid filtration device as recited in claim 2, wherein at least one annular sealing rib projects upwardly from an upper surface of said support flange for sealingly engaging a lower layer of a lowermost filtration cell in said filter assembly.

5. A fluid filtration device as recited in claim 2, wherein annular spacer rings are positioned between adjacent filtration cells in said filter assembly, and said spacer rings each include at least one upper sealing rib for sealingly engaging a lower layer of an adjacent filtration cell located thereabove and at least one lower annular sealing rib for sealingly engaging an upper layer of an adjacent filtration cell located therebelow.

6. A fluid filtration device as recited in claim 2, further comprising means disposed in said lower housing portion of said capsule housing for reducing hold-up volume.

7. A fluid filtration device as recited in claim 6, wherein said means for reducing hold-up volume comprises an annular volume reducer circumjacent said annular support flange.

8. A fluid filtration device as recited in claim 1, wherein a drainage port is formed in said lower housing portion for facilitating drainage of excess process fluid accumulated within said lower housing portion.

9. A fluid filtration device as recited in claim 8, further comprising means for retrieving excess process fluid from said lower housing portion through said drainage port.

10. A fluid filtration device as recited in claim 9, wherein said means for retrieving excess process fluid from said lower housing portion includes a supplemental fluid filtration unit, said supplemental fluid filtration unit having an inlet port for receiving excess process fluid from said lower housing portion and an outlet port for transferring said excess process fluid to a containment device.

11. A fluid filtration device as recited in claim 10, further comprising a conduit having a connector at one end for mating with said drainage port and a connector at an opposed end for mating with said inlet port of said supplemental fluid filtration unit.

12. A fluid filtration device as recited in claim 8, wherein a vent port is formed in said upper housing portion.

13. A fluid filtration device as recited in claim 1, wherein the engagement fitting comprises radially spaced apart elongate support struts, said support struts having an upper end portion and a lower end portion, the lower end portion of each support strut being formed with an inwardly tapered notch portion and a radially outwardly extending terminal portion having an inwardly tapered leading edge.

14. A fluid filtration device as recited in claim 13, wherein the terminal end portion of each support strut has an outer diameter that is greater than the inner diameter of the annular retention ring, and the tapered leading edge of each terminal end portion dimensionally conforms to the inner diameter of said annular retention ring to ease the passage of the terminal end portion past said annular retention ring during assembly of the filtration device.

15. A fluid filtration device as recited in claim 13, wherein the annular retention ring comprises four radially spaced apart retention segments separated equidistant from each other and four corresponding recesses formed below the four retention segments, thereby permitting the terminal end portions of each support strut to extend past the retention segments without interference, whereupon the mounting post is subsequently rotated into a locked position in which the terminal end portions of the support struts engage the corresponding recesses formed below the four retention segments.

16. A fluid filtration device as recited in claim 1, wherein said upper housing portion and said lower housing portion are joined together along a joint, said joint comprising a circumferential tongue on a mating surface of said upper housing portion and a circumferential groove in a mating surface of said lower housing portion.

17. A fluid filtration device as recited in claim 16, wherein said groove is dimensioned and configured as a flash trap to accommodate residual flash material produced when said tongue and groove are joined together by vibratory welding to ensure the formation of an aesthetically pleasing commercial product.

18. A fluid filtration device as recited in claim 1, further comprising means disposed in said lower housing of said capsule housing for reducing hold-up volume.

19. A fluid filtration device as recited in claim 1, wherein the annular retention ring comprises a continuous ring.

20. A method of manufacturing a fluid filtration device comprising the steps of:
   a) providing a capsule housing including an upper housing portion and a lower housing portion, said upper housing portion having an upper circumferential mating surface, said lower housing portion having a lower circumferential mating surface and an annular retention ring
   b) providing a filter assembly including an elongated mounting post having an upper end portion including a compression flange and a lower end portion including an engagement fitting dimensioned and configured to engage the annular retention ring formed within the lower housing portion, said annular retention ring projecting radially to engage said engagement fitting and a plurality of filtration cells supported on said mounting post in axially spaced apart relationship; and
   c) engaging said engagement fitting of said mounting post in said annular retention ring of said lower housing portion so as to axially compress said filtration cells relative to said mounting post to effect a positive seal between said filtration cells and said lower housing portion.

21. A method of manufacturing a fluid filtration device according to claim 20, further comprising the step of joining the mating surfaces of said upper and lower housing portion to one another by vibratory welding.

22. A fluid filtration device comprising:
   a) a capsule housing including an upper housing portion defining a fluid inlet and a lower housing portion defining a fluid outlet;
   b) a filter assembly including an elongated mounting post and at least one filtration cell supported on said mounting post, said mounting post having an integral engagement fitting formed at a lower end portion thereof; and
   c) a retention structure integrally formed in said lower housing portion adjacent said fluid outlet for receiving and retaining said engagement fitting of said mounting post, said retention structure including a annular retention ring projecting radially inwardly to engage said engagement fitting, said at least one filtration cell adapted to be axially compressed relative to said mounting post when said engagement fitting is engaged with said annular retention ring.

23. A fluid filtration device as recited in claim 22, wherein said mounting post has a radially outwardly extending compression flange formed at an upper end portion thereof, and said compression flange including means for sealingly engaging an upper surface of said at least one filtration cell.

24. A fluid filtration device as recited in claim 22, wherein a support structure is formed in said lower housing portion adjacent said fluid outlet, said support structure including means for sealingly engaging at lower surface of said at least one filtration cell.

25. A fluid filtration device as recited in claim 22, wherein said filter assembly includes at least upper and lower filtration cells and an annular spacer ring is disposed on said mounting post between said upper and lower filtration cells, said spacer ring including means for sealingly engaging said upper filtration cell and means for sealingly engaging said lower filtration cell.

* * * * *

UNITED STATES PATENT AND TRADEMARK OFFICE
CERTIFICATE OF CORRECTION

PATENT NO. : 5,965,019
DATED : October 12, 1999
INVENTOR(S) : Daniel K. Olsen

It is certified that error appears in the above-identified patent and that said Letters Patent is hereby corrected as shown below:

Delete the reference designation "$H_f$" in Figure 6 and insert --$H_i$-- therefor.
Delete the word "rib" at Claim 1, column 10, line 9, and insert the word --ring-- therefor.

Signed and Sealed this

Twenty-fourth Day of October, 2000

Attest:

Q. TODD DICKINSON

Attesting Officer

Director of Patents and Trademarks